(12) United States Patent
Ogawa et al.

(10) Patent No.: US 8,091,873 B2
(45) Date of Patent: Jan. 10, 2012

(54) CONED DISC SPRING

(75) Inventors: Yukitoshi Ogawa, Ichinomiya (JP); Takayuki Ishikawa, Anjou (JP); Akihiko Kita, Anjo (JP); Shigeo Tsuzuki, Anjo (JP); Hiroyuki Nozaki, Anjo (JP); Hironobu Imaizumi, Aikoh-gun (JP)

(73) Assignees: Toyota Jidosha Kabushiki Kaisha, Toyota (JP); Aisin Aw Co., Ltd., Yokohama (JP); NHK Spring Co., Ltd., Kanagawa (JP)

( * ) Notice: Subject to any disclaimer, the term of this patent is extended or adjusted under 35 U.S.C. 154(b) by 709 days.

(21) Appl. No.: 11/883,948

(22) PCT Filed: Feb. 10, 2006

(86) PCT No.: PCT/JP2006/302348
§ 371 (c)(1),
(2), (4) Date: Sep. 4, 2007

(87) PCT Pub. No.: WO2006/085610
PCT Pub. Date: Aug. 17, 2006

(65) Prior Publication Data
US 2008/0136075 A1   Jun. 12, 2008

(30) Foreign Application Priority Data
Feb. 10, 2005   (JP) .................................. 2005-035247

(51) Int. Cl.
F16F 1/34   (2006.01)

(52) U.S. Cl. ..................... 267/161; 267/164; 192/109 A

(58) Field of Classification Search .......... 267/161–164; 192/109 A, 109 B, 109 F, 85 AA; 188/166, 188/167, 71.5
See application file for complete search history.

(56) References Cited

U.S. PATENT DOCUMENTS

| | | | | |
|---|---|---|---|---|
| 3,107,766 A | * | 10/1963 | Pritchard | 192/89.1 |
| 3,250,349 A | * | 5/1966 | Tayler, Jr. et al. | 188/218 R |
| 5,148,904 A | * | 9/1992 | Takashi et al. | 192/89.1 |
| 5,620,075 A | * | 4/1997 | Larsen et al. | 192/53.34 |
| 5,857,666 A | | 1/1999 | Zhi-Peng et al. | |
| 6,648,106 B2 | * | 11/2003 | Hayabuchi et al. | 188/82.1 |

(Continued)

FOREIGN PATENT DOCUMENTS
DE   102 39 400 A1   2/2004
(Continued)

OTHER PUBLICATIONS

Search Report issued on Nov. 27, 2009 in European Patent Application No. 06713491.6.

(Continued)

Primary Examiner — Robert Siconolfi
Assistant Examiner — Mariano Sy
(74) Attorney, Agent, or Firm — Oliff & Berridge PLC

(57) ABSTRACT

A coned disc spring is arranged between a second component and a third component provided inside a tubular first component and movable in an axial direction. The coned disc spring comprises a body having a circular dish shape, teeth closely fitting into spline grooves formed on an inner peripheral surface of the first component and projecting to a radial outer side on an outer periphery of the body, and a stress relaxation portion formed by notching a base of the tooth in an approximately circular arc shape in a direction at least one of a circumferential direction and a radial direction of the body.

1 Claim, 5 Drawing Sheets

U.S. PATENT DOCUMENTS

| | | | |
|---|---|---|---|
| 7,237,664 B2 * | 7/2007 | Sugita et al. | 192/70.2 |
| 7,438,168 B2 * | 10/2008 | Kita et al. | 192/85.34 |

FOREIGN PATENT DOCUMENTS

| | | |
|---|---|---|
| DE | 102 49 979 A1 | 2/2004 |
| DE | 10 2004 010 780 A1 | 9/2004 |
| EP | 1 452 760 A1 | 9/2004 |
| FR | 2 568 337 A1 | 1/1986 |
| JP | A-61-41029 | 2/1986 |
| JP | A-62-132037 | 6/1987 |
| JP | A 01-303321 | 12/1989 |
| JP | A 09-329155 | 12/1997 |
| JP | A 2000-274470 | 10/2000 |
| JP | A 2001-295860 | 10/2001 |

OTHER PUBLICATIONS

Feb. 23, 2011 Office Action issued in Japanese Patent Application No. 2005-035247 (with English Translation).

* cited by examiner

CONED DISC SPRING

BACKGROUND

1. Technical Field

The present invention relates to coned disc springs that are used to absorb shocks occurring during the engaging of a clutch of a multiplate clutch structure of a transporting machine. Specifically, the present invention relates to improvement in a coned disc spring comprising teeth for inhibiting relative rotation with respect to a clutch drum.

2. Background Art

A wet-type multiplate clutch structure is used as a clutch structure in a transmission of a transporting machine. The wet-type multiplate clutch structure comprises a coned disc spring used for absorbing shocks occurring during the engaging of a clutch. FIG. 4 is an enlarged sectional side view showing a composition of a multiplate clutch structure 100 provided with a conventional coned disc spring 200. The multiplate clutch structure 100 comprises a cylindrical clutch drum 101 having a bottom. Plural spline grooves 101A, extending in the axial direction, are formed along the circumferential direction on the inner peripheral surface of the clutch drum 101. In the clutch drum 101, a tubular clutch hub 102 is provided thereat and has a common rotation axis with respect to the clutch drum 101. Plural spline grooves 102A, extending in the axial direction, are formed along the circumferential direction on the outer periphery of the clutch hub 102.

Driven plates 103 and driving plates 104 are alternately arranged with predetermined spaces between the clutch drum 101 and the clutch hub 102. The driven plate 103 is closely fitted to the spline groove 101A of the clutch drum 101, and the driving plate 104 is closely fitted to the spline groove 101A of the clutch hub 102, and they can move in the axial direction. A piston 105, which is movable in the axial direction, is provided at the bottom side of the clutch drum 101. An oil pressure space 106 is provided between the piston 105 and the clutch drum 101.

A coned disc spring 200 having a hole in the center and a circular dish shape is provided between the driven plate 103, which is on the bottom side of the clutch drum 101, and the piston 105. The coned disc spring 200 is supported by the driven plate 103 at the surface of the outer periphery, and by the piston 105 at the back of the inner periphery.

In the above multiplate clutch structure 100, when operating oil is supplied to the oil pressure space 106, the piston 105 driven by oil pressure presses the driven plate 103, which is on the bottom side of the clutch drum 101, through the coned disc spring 200. Then, the driven plate 103 on the bottom side of the clutch drum 101 moves to the opening of the clutch drum 101, and friction surfaces of the driven plate 103 and the driving plate 104, which are placed oppositely to each other, engage, whereby they are clutched. In this case, the coned disc spring 200 elastically deforms from the dish shape to become flattened, thereby absorbing shocks that occur during the engaging of the clutch.

The above coned disc spring 200 has a circular shape, whereby it tends to relatively rotate with respect to the clutch drum 101 during rotation of the clutch structure 100. Therefore, the coned disc spring 200 frequently hits the inside wall of the clutch drum 101, which may cause a problem of wear on the inside of the wall of the clutch drum 101.

In order to solve the above problem, a coned disc spring 300 has been proposed (for example, see Japanese Unexamined Patent Application Publications Nos. 2001-295860 and H9-329155). As shown in FIGS. 5A to 5C, the coned disc spring 300 comprises a body 310 having a hole 310A in the center and having a circular dish shape, and plural teeth 311 are formed on the outer periphery of the body 310. The body 310 of the coned disc spring 300 is arranged at the inside of the clutch drum 101, so that the teeth 311 are closely fitted to the spline grooves 101A on the inner peripheral surface of the clutch drum 101, whereby the coned disc spring 300 does not relatively rotate as described above.

When the above coned disc spring 300 is elastically deformed during the engaging of a clutch, a concentration of stress occurs at the base of the teeth 311. Therefore, there has been a problem in that the durability of the coned disc spring 300 is greatly decreased.

In order to reduce the stress that may occur at the base of the teeth 311, a radius of curvature R of a circular arc portion 311A at the base of the teeth 311 may be enlarged. In this case, the circular arc portion 311A at the base of the teeth 311 extends in the circumferential direction and projects to the radial outer side. Therefore, if a corner portion of the spline groove 101A of the clutch drum 101 is sharp, the base of the tooth 311 heavily interferes with the spline groove 101A during rotation of the clutch drum 101. Accordingly, wear of the spline groove 101A caused by the tooth 311 increases. Moreover, a length L of a straight portion 311B on the side of the teeth 311 is shortened, and the area in which the tooth 311 and the spline groove 101A are closely fitted is decreased. Therefore, a contact pressure due to the tooth 311 at the spline groove 101A is increased, and the wear of the spline groove 101A caused by the tooth 311 is increased. Specifically, in order to ensure that the display of the correct mileage of an automobile, which has been increasing recently, the coned disc spring 300 is required to be highly durable. Accordingly, the above problems need to be solved.

SUMMARY

An object of the present invention is to provide a coned disc spring by which a stress occurring at a base of a tooth during the engaging of a clutch is decreased, and by which wear of a spline groove caused by the tooth is decreased.

The present invention provides a coned disc spring arranged between a second and a third component provided inside a tubular first component and which is movable in an axial direction. The coned disc spring comprises a body having a circular dish shape, teeth, and a stress relaxation portion. The tooth closely fits into a spline groove formed on an inner peripheral surface of the first component and extending in the axial direction, and it projects to a radial outer side on an outer periphery of the body. The stress relaxation portion is formed at a base of the tooth. The stress relaxation portion has: a first circular arc portion formed by notching the base of the tooth in an approximately circular arc shape in a radial direction of the body and having opposite first and second ends, wherein the first end is smoothly connected to the outer periphery of the body; and a second circular arc portion formed by notching the base of the tooth in an approximately circular arc shape in a circumferential direction of the body and having opposite first and second ends, wherein the first end is smoothly connected to the second end of the first circular arc portion, and the second end is smoothly connected to a side of the tooth.

The coned disc spring of the present invention comprises a stress relaxation portion having a first circular arc portion formed by notching the base of the tooth in an approximately circular arc shape in a radial direction of the body; and a second circular arc portion formed by notching the base of the tooth in an approximately circular arc shape in a circumferential direction of the body. Therefore, the base of the tooth may have a large radius of curvature R without projecting to the radial outer side. Accordingly, when the above coned disc spring is arranged between a driven plate and a piston in a clutch structure of a transporting machine, the stress relaxation portion can reduce stress occurring at the base of the tooth during the engaging of the clutch. Moreover, even if a corner portion of a spline groove of a clutch drum is sharp, the base of the tooth does not interfere with the spline groove during rotation of the clutch drum, whereby wear of the spline groove caused by tooth can be reduced. Therefore, the coned disc spring may be highly durable, thereby ensuring proper display of recently increasing automobile mileage.

The coned disc spring of the present invention is explained with reference to FIG. 3. FIG. 3 is a view explaining a relationship between the radius of curvature R of the base of a tooth and a stress occurring thereat relating to various shapes of the coned disc spring of the present invention. In FIG. 3, a curve (a) indicates characteristics of a conventional coned disc spring (hereinafter referred to as coned disc spring "a"), and a curve (b) indicates characteristics of a coned disc spring (hereinafter referred to as coned disc spring "b") of the present invention comprising a stress relaxation portion formed by notching the base of a tooth in a circular arc shape in the radial direction and along the circumferential direction.

When the radius of curvature R of the base of a tooth of the conventional coned disc spring "a" is enlarged, the stress occurring thereat is decreased. In this case, the circular arc portion of the base of the tooth extends along the circumferential direction and projects to the radial outer side. Therefore, as mentioned above, if a corner portion of the spline groove of the clutch drum is sharp, the base of the tooth heavily interferes with the spline groove. Accordingly, wear of the spline groove caused by the tooth is increased. Moreover, the length of a straight portion at the side of the tooth is shortened, whereby an area in which the tooth and the spline groove are closely fitted is decreased. Therefore, a contact pressure occurring due to the tooth at the spline groove is increased, and wear of the spline groove caused by the tooth is increased. Accordingly, if the radius of curvature R of the base of the tooth is set to be larger than the value of point P on the curve (a), the durability of the coned disc spring is greatly reduced. As a result, the radius of curvature R cannot be set to be larger than the value of point P.

On the other hand, in the coned disc spring "b", the stress relaxation portion is formed by notching the base of the tooth in an approximately circular arc shape in a radial direction and a circumferential direction of the body. Therefore, if a corner portion of the spline groove of the clutch drum is sharp, even if the coned disc spring "b" is set to have a larger radius of curvature R at the base of the tooth than that of a conventional coned disc spring "a", the tooth does not interfere with the spine groove, as in the case of the coned disc spring "b" of the present invention. Thus, when the coned disc spring "b" is compared to a conventional coned disc spring "a", it may have a large radius of curvature R, which is shown by the point S, whereby stress occurring at the base of the tooth during engaging of the clutch is reduced.

BRIEF DESCRIPTION OF THE DRAWINGS

FIG. 1A is a plan view, FIG. 1B is a sectional side view taken along line B-B of FIG. 1B, and FIG. 1C is a partially enlarged view of FIG. 1B.

FIG. 2A is an enlarged sectional side view and FIG. 2B is an exploded view.

FIG. 5A is a plan view, FIG. 5B is a sectional side view taken along line B-B of FIG. 5A, and FIG. 5C is a partially enlarged view of FIG. 5A.

DETAILED DESCRIPTION OF EMBODIMENTS

1. Compositions of Embodiment

A. Coned Disc Spring

Figure 1A:
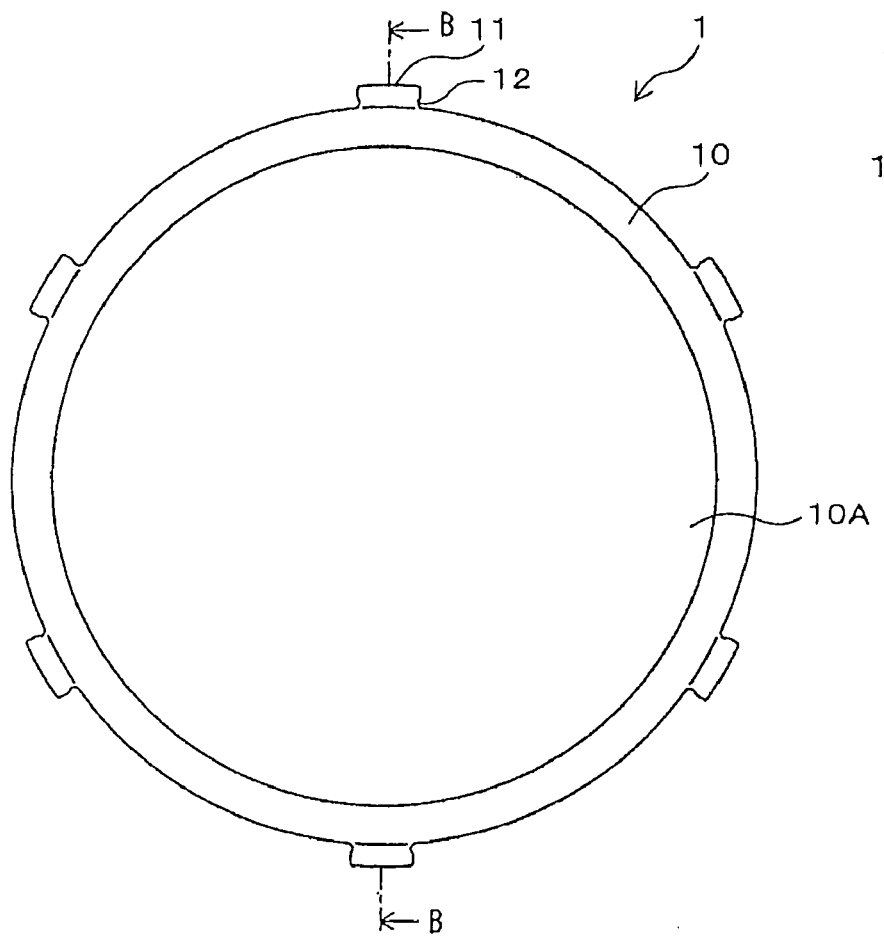
FIGS. 1A to 1C are views showing a coned disc spring relating to the first embodiment of the present invention.
Figure 1B:
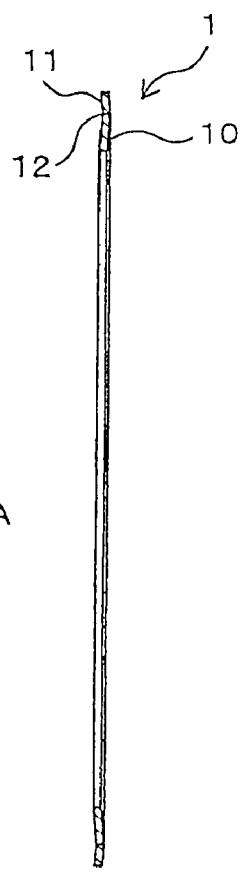
Figure 1C:
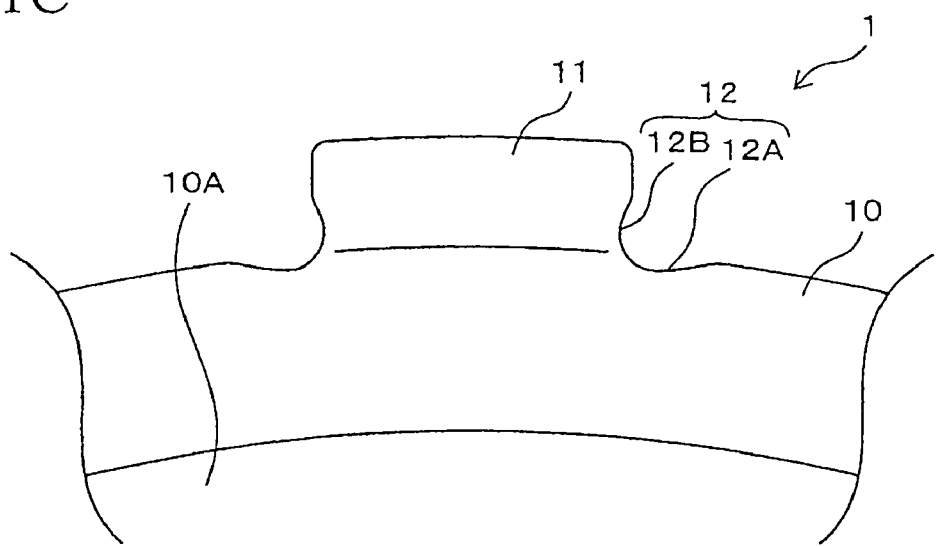

An embodiment of the present invention is explained with reference to the drawings. FIGS. 1A to 1C are views showing a composition of a coned disc spring 1 relating to an embodiment of the present invention, and FIG. 1A is a plan view, FIG. 1B is a sectional side view taken along line B-B of FIG. 1B, and FIG. 1C is a partially enlarged view of FIG. 1A. The coned disc spring comprises a body 10 having a circular dish shape and has a hole 10A having a circular shape in the center of the body 10. The outer periphery of the body 10 is formed with plural teeth 11 (for example, six teeth) at equal intervals along the circumferential direction. The teeth 11 have an approximately rectangular shape and project to the radial outer side of the body 10. For example, when the teeth 11 are applied to the following clutch structure 100, they may prevent the coned disc spring 1 from relative rotating with respect to a clutch drum 101. It should be noted that the teeth used for the present invention are not limited to the teeth 11 shown in FIGS. 1A to 1C, and various shapes of teeth may be used. For example, the teeth may have a shape which does not bend at the outer periphery of the body 10, and which extends along the outer periphery of the body 10. The number of the teeth is six, but this is not limited thereto, and any number of teeth can be selected.

The base of the teeth 11 is notched in approximately a circular arc shape along the radial direction and the circumferential direction to form a stress relaxation portion 12. For example, when the stress relaxation portion 12 is provided to the following clutch structure 100, it relaxes the stress concentrated at the base of the teeth 11 during the engaging of the clutch. The stress relaxation portion 12 comprises circular arc portions 12A and 12B that have a circular arc shape and are formed from the outer periphery of the body 10 toward the side of the teeth 11, in that order. The circular arc portion 12A (a first circular arc portion) has opposite first and second ends, and the first end is smoothly connected to the outer periphery of the body 10. The circular arc portion 12B (a second circular arc portion) has opposite first and second ends, and the first end is smoothly connected to the second end of the circular arc portion 12A, and the second end is smoothly connected to the side of the teeth 11.

B. Clutch Structure

Figure 2A:
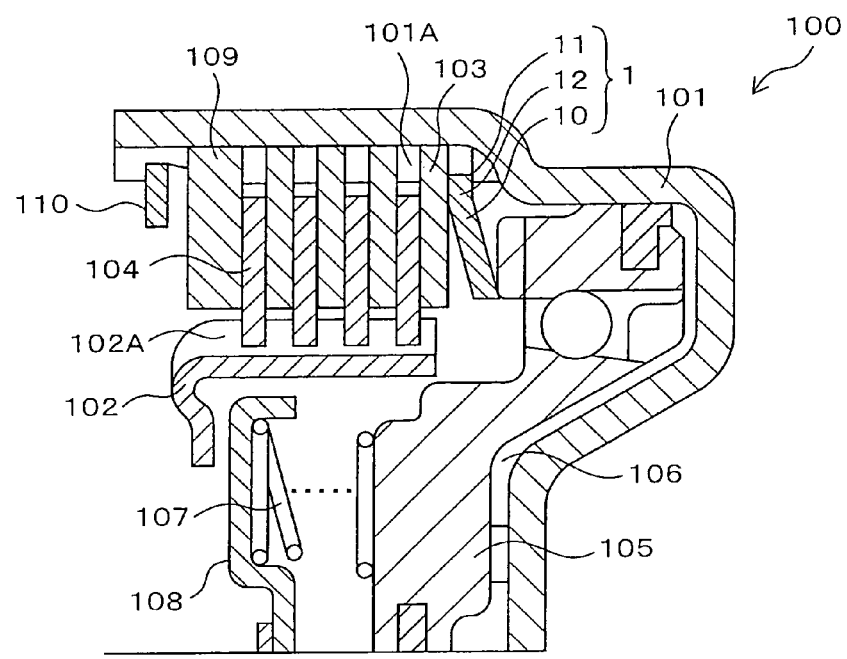
FIGS. 2A and 2B are views showing a composition of a clutch structure provided with a coned disc spring shown in FIGS. 1A to 1C.
Figure 2B:
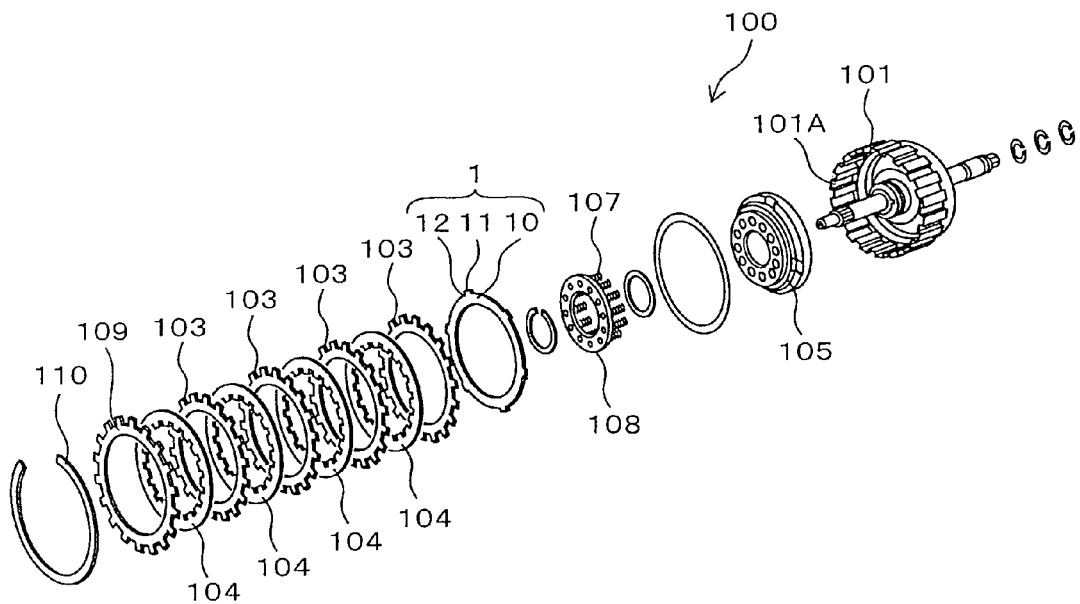
Figure 3:
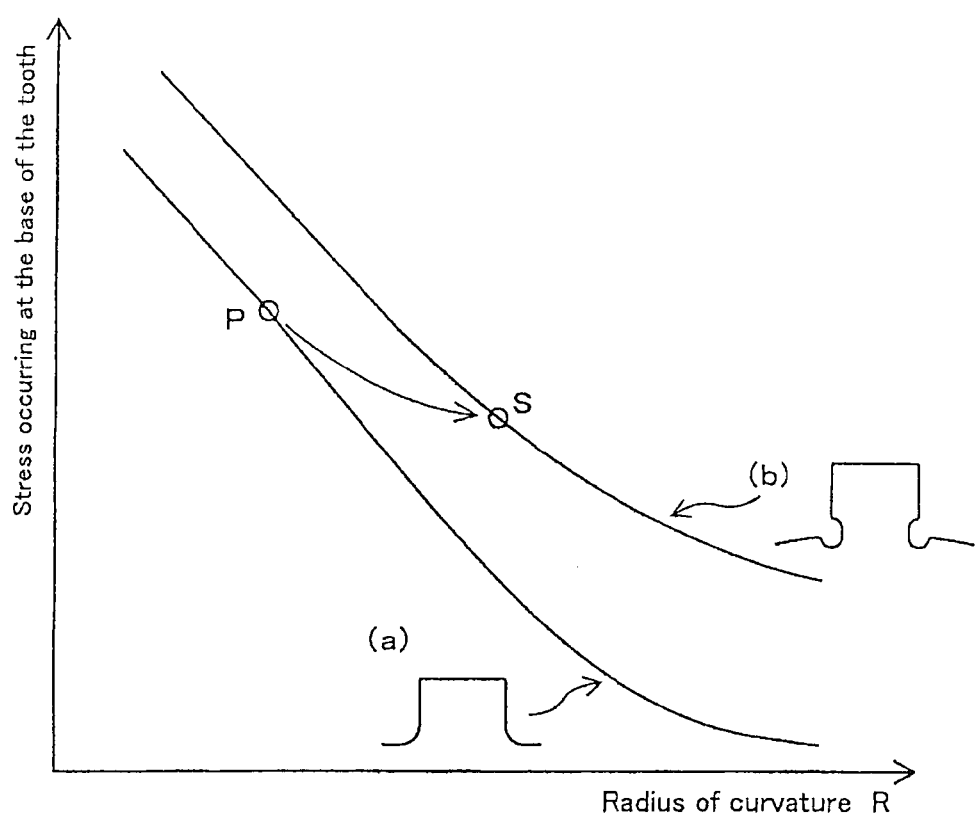
FIG. 3 is a view explaining a relationship between the radius of curvature R at the base of a tooth and stress occurring thereat, which relates to the coned disc spring of the present invention.
Figure 4:
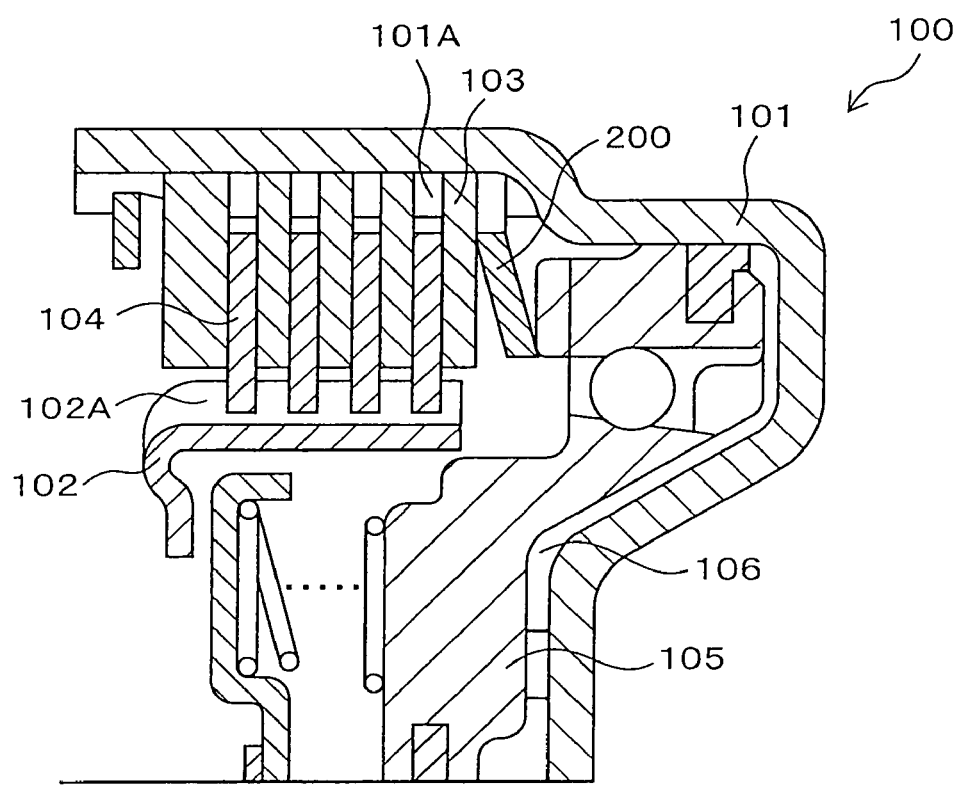
FIG. 4 is a sectional side view showing a composition of a multiplate clutch structure provided with a conventional coned disc spring.
Figure 5A:
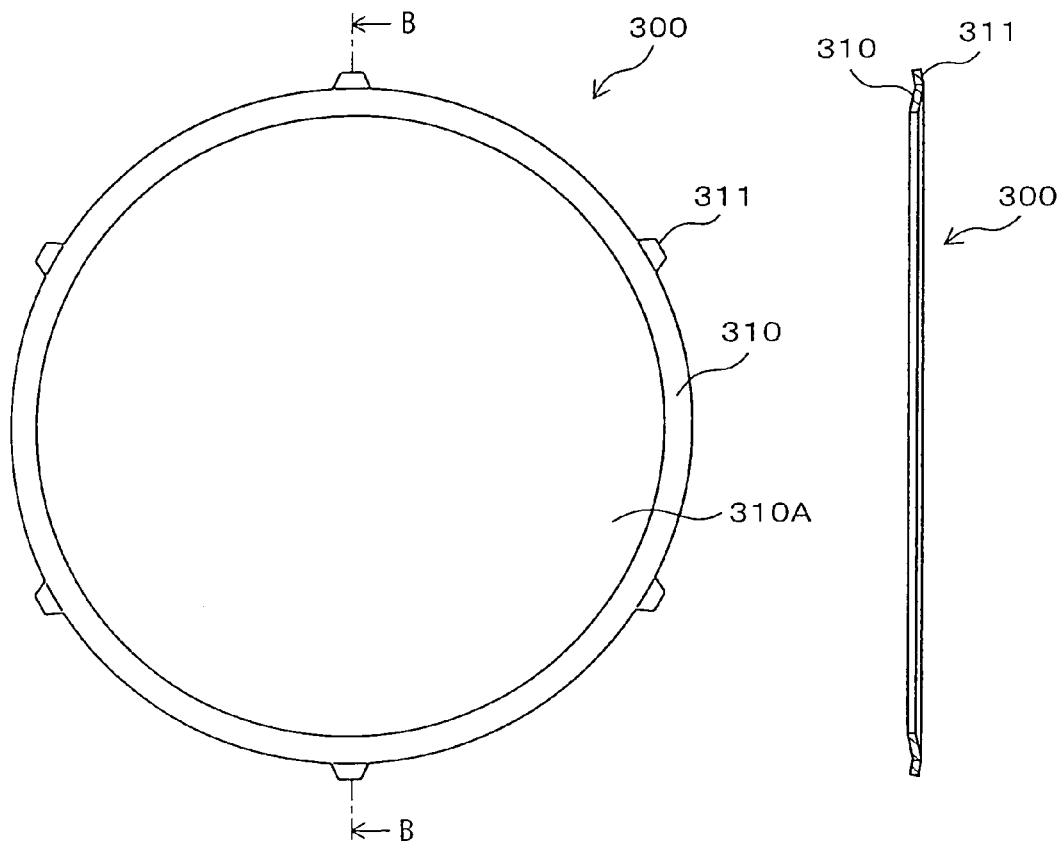
FIGS. 5A to 5C are views showing a composition of another conventional coned disc spring.
Figure 5B:
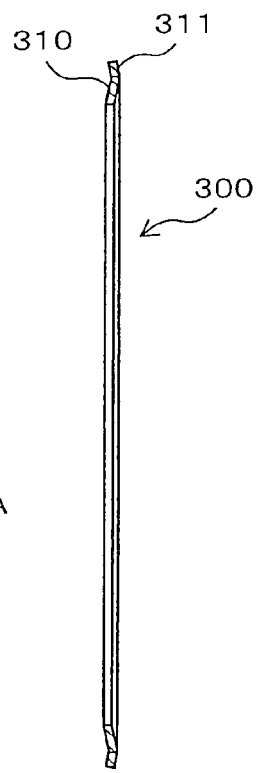
Figure 5C:
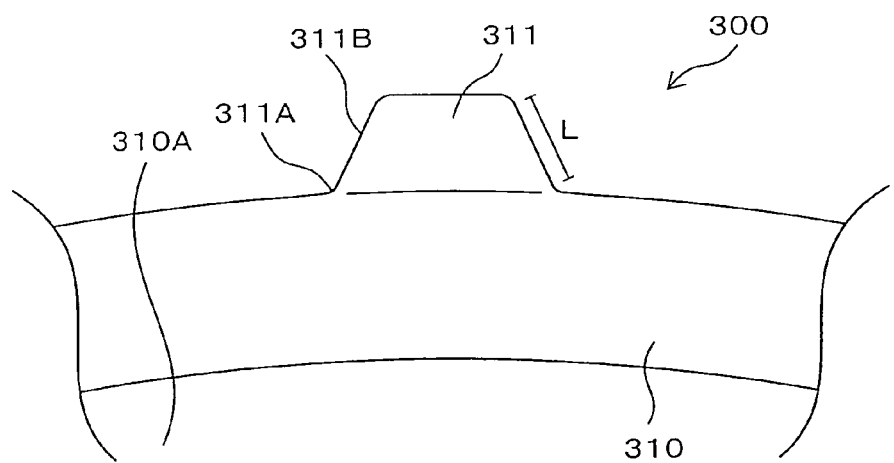

The above coned disc spring 1 may be applied to a clutch structure 100 shown in FIGS. 2A and 2B. FIGS. 2A and 2B show a composition of a clutch structure 100, and FIG. 2A is an enlarged sectional side view and FIG. 2B is an exploded view. A clutch hub 102 is omitted in FIG. 2B.

The clutch structure 100, for example, is a wet-type multiplate clutch structure used for automatic cars. The clutch structure 100 comprises a cylindrical clutch drum 101 (a first component) having a bottom. Plural spline grooves 101A, extending in the axial direction, are formed along the circumferential direction on the inner peripheral surface of the clutch drum 101. A tubular clutch hub 102 is provided to the clutch drum 101 and has a common rotation axis with respect to the clutch drum 101. Plural spline grooves 102A, extending in the axial direction, are formed at equal intervals along the circumferential direction on the outer periphery of the clutch hub 102.

A driven plate 103 (a second component) and a driving plate 104, which have a circular disc shape and are each formed with a hole in the center, are alternately arranged at predetermined intervals between the clutch drum 101 and the clutch hub 102. The driven plate 103 is formed with plural teeth on the outer periphery thereof at equal intervals along the circumferential direction, and the teeth are closely fitted to the spline grooves 101A. Therefore, the driven plate 103 cannot relatively rotate with respect to the clutch drum 101, but it can move in the axial direction. The driving plate 104 is formed with plural teeth on the inner periphery thereof at equal intervals along the circumferential direction, and the teeth are closely fitted to the spline grooves 102A. Therefore, the driving plate 104 cannot relatively rotate with respect to the clutch hub 102, but it can move in the axial direction.

A piston 105 (a third component), which is movable in the axial direction, is provided at the bottom side of the clutch drum 101. An oil pressure space 106, to which operating oil is supplied, is provided between the bottom of the clutch drum 101 and the piston 105. The piston 105 is driven by the operating oil supplied to the oil pressure space 106 in the axial direction. A return spring 107 is fixed by an end thereof on the surface of the piston 105 at the opening side of the clutch drum 101. The return spring 107 expands and contracts by pressure loaded thereon. The return spring 107 is fixed to a spring retainer 108 by another end thereof. The return spring 107 biases the piston 105 to the bottom of the clutch drum 101.

The above coned disc spring 1 is arranged between the driven plate 103, which is on the bottom side of the clutch drum 101, and the piston 105. In this case, in the coned disc spring 1, the teeth 11 are splined to the spline grooves 101A, the body 10 is supported by the driven plate 103 at the surface of the outer periphery thereof, and the body 10 is simultaneously supported by the piston 105 at the back of the inner periphery thereof. Therefore, the coned disc spring 1 cannot relatively rotate with respect to the clutch drum 101, but it can move in the axial direction.

In the clutch drum 101, in order that the driven plate 103 and the driving plate 104 do not move beyond a predetermined position, a retaining plate 109 is arranged at the opening side thereof. The retaining plate 109 is formed with plural teeth on the outer periphery thereof at equal intervals along the circumferential direction, and the teeth are closely fitted to the spline groove 101A. Therefore, the retaining plate 109 cannot relatively rotate with respect to the clutch drum 101, but it can move in the axial direction. A snap ring 110 is arranged on the surface of the retaining plate 109 at the opening side of the clutch drum 101, so that the retaining plate 109 does not go off to the outside. The snap ring 110 is latched together with a ring groove formed on an end of the opening side of the clutch drum 101.

2. Operation of Embodiment

The operation of the clutch structure 100 provided with the coned disc spring 1 will be explained with reference to FIG. 2A.

When an operating oil is supplied to the oil pressure space 106, the piston 105 is driven by the oil pressure, and it moves toward the opening side of the clutch drum 101 along the axis line with respect to the bias power of the return spring 107. The piston 105 presses the driven plate 103, which is on the bottom side of the clutch drum 101, through the coned disc spring 101. Then, the driven plate 103 and the driving plate 104, which are alternately arranged, and the retaining plate 109 move to the opening side of the clutch drum 101 along the axis line. Thus, when the retaining plate 109 is pushed by the snap ring 110, the friction surfaces of the driven plate 103 and the driving plate 104 which oppose each other, are engaged and are clutched. Therefore, torque can be transmitted from the clutch drum 101 to the clutch hub 102.

In this case, the coned disc spring 1 is elastically deformed from the dish shape to flattish shape, whereby it absorbs the shocks occurring during the engaging of the clutch. When the coned disc spring 1 is elastically deformed, stress occurring at the base of the teeth 11 is reduced by the stress relaxation portion 12. The stress relaxation portion 12 does not project to the radial outer side, whereby the tooth 11 does not interfere with the spline groove 101A during rotation of the clutch drum 101.

When the supply of the operating oil to the oil pressure space 106 is stopped, the piston 105 is pushed back to the bottom side of the clutch drum 101 by the bias power of the return spring 107. Then, the friction surfaces of the driven plate 103 and the driving plate 104 are disengaged and are unclutched, and the coned disc spring 1 simultaneously returns to the former shape.

In the above embodiment, the coned disc spring 1 comprises a stress relaxation portion 12 having the circular arc portion 12A formed by notching the base of the tooth 11 in an approximately circular arc shape in the circumferential direction of the body 10; and the circular arc portion 12B formed by notching the base of the tooth 11 in an approximately circular arc shape in the circumferential direction of the body 10, whereby the base of the tooth 11 can have a large radius of curvature R without projecting to the radial outer side. Therefore, when the above coned disc spring 1 is arranged between the driven plate 103 and the piston 105 in the clutch structure 100 of a transporting machine, the stress relaxation portion 12 can reduce the stress occurring at the base of the teeth 11 during the engaging of the clutch. Furthermore, even if a corner portion of the spline groove 101A of the clutch drum 101 is sharp, the tooth 11 does not interfere with the spline groove 101A during rotation of the clutch drum 101, whereby wear of the spline groove 101A caused by the tooth 11 may be reduced. Accordingly, the coned disc spring 1 may be highly durable, thereby ensuring the accurate displays of the recently increasing mileage of automobiles.

3. Additional Example

The present invention is explained with reference to the above embodiment, but this is not limited to the above embodiment, and various compositions are possible. For example, in the above embodiment, a coned disc spring of the present invention is used for a wet-type multiplate clutch for automatic cars, but this is not limited thereto. For example, the coned disc spring of the present invention may be used for a multiplate clutch structure of a construction machine and a transporting machine such as two-wheeled motor vehicles.

The invention claimed is:

1. A coned disc spring, arranged between a second component and a third component provided inside a tubular first component and movable in an axial direction, comprising:

a body having a circular dish shape;

teeth closely fitting into spline grooves which are formed on an inner peripheral surface of the first component and extend in the axial direction and projecting to a radial outer side on an outer periphery of the body, the teeth preventing the body from relative rotation with respect to the tubular first component; and a stress relaxation portion formed at a base of a tooth of the teeth, wherein the stress relaxation portion having:

a first circular arc portion formed by notching the base of the tooth in an approximately circular arc shape in a radial direction of the body and having opposite first and second ends, wherein the first end of the first circular arc portion is smoothly connected to the outer periphery of the body;

a second circular arc portion formed by notching the base of the tooth in an approximately circular arc shape in a circumferential direction of the body and having opposite first and second ends, wherein the first end of the second circular arc portion is smoothly connected to the second end of the first circular arc portion, and the second end of the second circular arc portion is smoothly connected to a side of the tooth; and the second circular arc portion being configured such that a width of the base of each of the teeth, in the circumferential direction, is smaller than a width of a distal end of each of the teeth in the circumferential direction.

* * * * *